2 Sheets—Sheet 1.
G. W. COY,
Assignor, by mesne assignments, to THE UNITED STATES TELEPHONE MANUFACTURING COMPANY.
Switch for Telephone Exchanges.
No. 9,764. Reissued June 14, 1881.
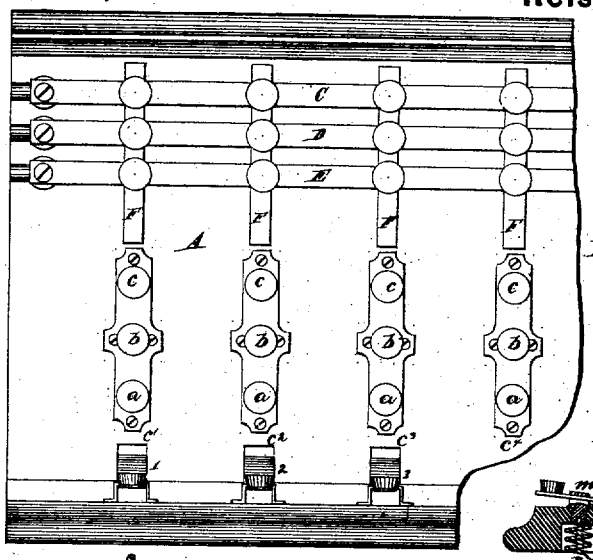
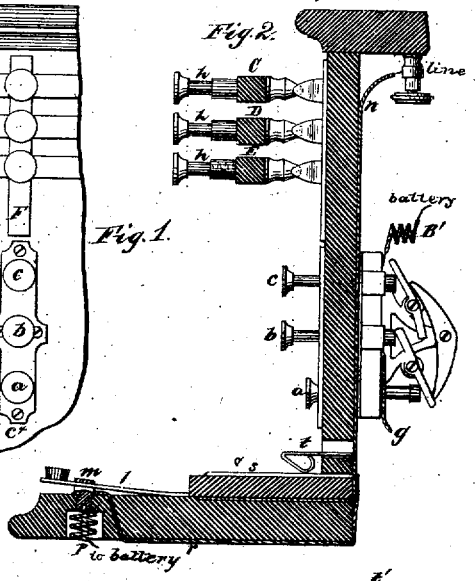
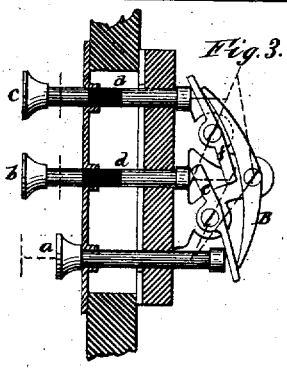
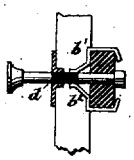
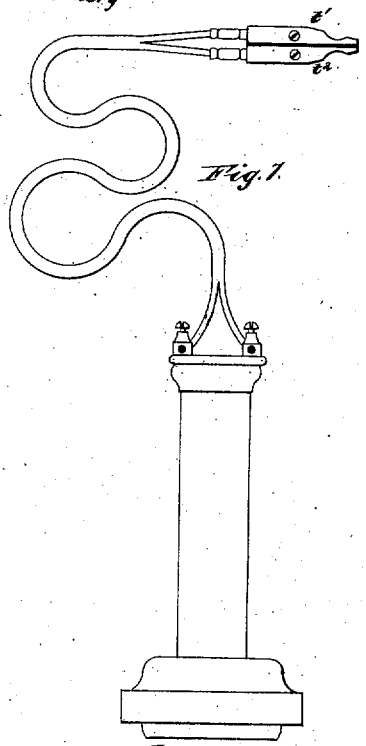
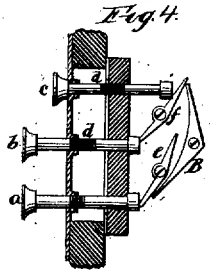
Witnesses:
Charles R. Searle
J. H. Acker
Inventor:
Geo. W. Coy
by H. C. Townsend
Atty.
THE NORRIS PETERS CO., WASHINGTON, D. C.

G. W. COY,

2 Sheets—Sheet 2.

Assignor, by mesne assignments, to THE UNITED STATES TELEPHONE MANUFACTURING COMPANY.

Switch for Telephone Exchanges.

No. 9,764. Reissued June 14, 1881.

*Witnesses:*

Charles R. Searle

J. E. Acker

*Inventor:*

Geo. W. Coy by W. G. Townsend

Atty.

THE NORRIS PETERS CO., WASHINGTON, D. C.

UNITED STATES PATENT OFFICE.

GEORGE W. COY, OF NEW HAVEN, CONNECTICUT, ASSIGNOR, BY MESNE ASSIGNMENTS, TO THE UNITED STATES TELEPHONE MANUFACTURING COMPANY, OF NEW YORK, N. Y.

SWITCH FOR TELEPHONE-EXCHANGES.

SPECIFICATION forming part of Reissued Letters Patent No. 9,764, dated June 14, 1881.

Original No. 224,653, dated February 17, 1880. Application for reissue filed March 1, 1881.

*To all whom it may concern:*

Be it known that I, GEORGE W. COY, of New Haven, in the county of New Haven and State of Connecticut, have invented a new Improvement in Electric Switches; and I do hereby declare the following, when taken in connection with the accompanying drawings and the letters of reference marked thereon, to be a full, clear, and exact description of the same, and which said drawings constitute part of this specification, and represent, in—

Figure 8:
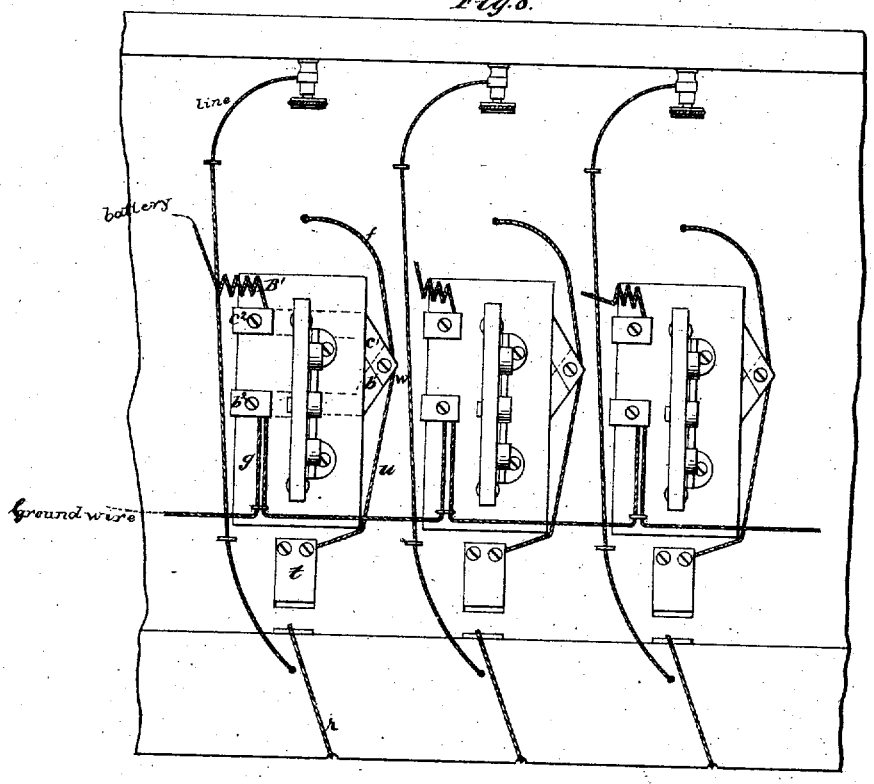

Figure 1, a front view; Fig. 2, a sectional end view; Figs. 3, 4, 5, and 6, detached views; Fig. 7, the telephone as fitted for use; Fig. 8, a rear view.

This invention relates to an improvement in electric switches designed with special reference to communication by telephone where several instruments are arranged upon the same circuit or several circuits centering at a single point, the object being to receive a call from one instrument at the central office for communication with a second instrument, and so as to call that instrument, and then put the two in communication; and the invention consists in the construction, as hereinafter described, and particularly recited in the claims.

Figure 5:
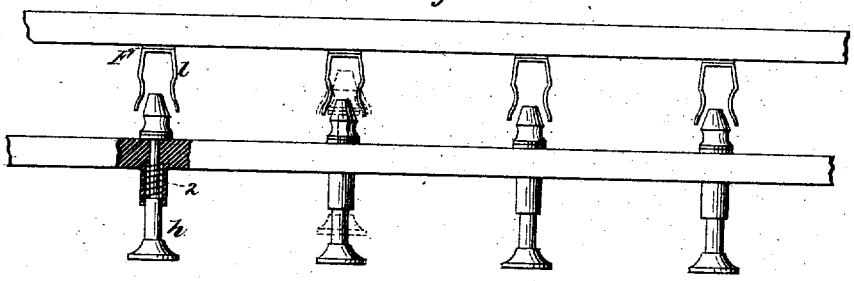

A represents the switch-board, on which are keys 1, 2, 3, and so on, more or less, according to the number of circuits or lines. Corresponding to each line are the switch-spindles *a b c*, each terminating in a conveniently-shaped knob in front. The two spindles *b* and *c* are each provided with an insulator, *d*, over a part of their length, for the purpose hereinafter described. At the inner or rear end of the spindles there are arranged three levers, *e*, *f*, and B. The one *e* is hung intermediately between the two spindles *a b*, and so that each of the said spindles will be in line with the respective arms of the said lever *e*. The other lever, *f*, is hung at a point intermediate between the two spindles *b c*, and so that the said spindles will be in line with the corresponding end of the said lever *f*. The lever B is hung centrally between the two spindles *a c*, so that one of its arms will ride upon the lower arm of the lever *e* and its other arm upon the upper arm of the lever *f*, as seen in Fig. 4. In this condition the spindle *c* stands at its extreme inward position and the spindles *b a* at their outward position, and which is the normal condition of the spindles. Now, if spindle *b* be pushed in, it will force the spindle *c* out; or if the spindle *a* be pushed in, it will, through the lever B, force the spindle *c* outward. Either one of the three spindles being in, pushing in either of the other two will force that one out—that is to say, only one of the spindles can be in its inward position at the same time. Above these spindles are one or more bars, C D E, each provided with a spindle, *h*, for each circuit, or corresponding to the respective series of spindles *a b c*. Below and on the board, in line with each series of spindles *a b c*, is a metallic plate, F, with a coupling, *l*, projecting from it toward each spindle *h*, as seen in Fig. 5, and the inner ends of the spindle *h* are constructed so that when forced inward they will make a connection with the coupling, as seen in Fig. 5, but when drawn out are free and away from the coupling. This coupling *l* is made of elastic metal, and the end of the spindle conical-shaped, as shown, so as to be forced between the end of the coupling, but may be otherwise formed.

A coiled spring, 2, serves to force and hold the spindle or connecting-piece in a disconnected position and prevents accidental contact. When the spindle or connecting-piece is forced inward toward the spring its end, by reason of its beveled or conical shape, may be made to bear with considerable force against the spring, and will at the same time make frictional contact, thus insuring good connection.

The line-wire *n* comes to the board and comes directly into connection with the key of that line shown as 1, Fig. 2. From the button under the key a wire, *p*, runs to the battery, and from the bridge *m* runs a second wire, *r*, to a metallic plate, *s*, and on this rests an elastic metallic plate or jaw, *t*, which extends through the board, and on the back a wire, *u*, runs from the jaw *t* to a point, *w*, where branches *b'* and *c'* lead, respectively, to make connection with either of the spindles $b$ $c$. These connections $b'$ $c'$ are made from strips of metal turned inward against the respective spindles, as seen in Fig. 6. In the opposite side of the spindles $b$ $c$ similar strips, $b^2$ $c^2$, lead outward. From the one $b^2$ runs the ground-wire $g$, and from the other, $c^2$, the battery-wire B'. From the point $w$ a wire, $f$, runs into connection with the metallic plate F, on which are the couplings $l$, to make connection with the spindle $h$ and their respective bars.

It will be observed that from the bridge through the plate $s$ and jaw $t$ to the point $w$ the circuit is substantially the same as if the wire ran direct without the interposition of the plate $s$ and jaw $t$.

The position of the strips $b'$ and $b^2$ relative to the spindles $b$ and $c$ is such that when the spindle is out the ends of those strips rest upon the insulator $d$, but when the spindle $b$ is in then they come in contact with the metal of that spindle and make ground-connection; or when the spindle $c$ is in it applies the battery, and the line is ready for a call.

The use of the elastic jaw $t$ and plate $s$ is to enable the person in attendance to apply a telephone, introducing it to either circuit with which he wishes to communicate; but instead of the jaw and plate a telephone may be applied to each circuit.

In Fig. 7 the telephone is shown as fitted for introduction between the jaw $t$ and plate $s$. The two wires of the telephone terminate in wedge-shaped metal tips $t'$ and $t^2$, with an insulator between. The operator forces this wedge-shaped tip between the jaw and plate, and thereby makes connection through the telephone, and is enabled with this single telephone to communicate through either of the circuits to which he may apply it.

The operation of the switch is as follows: The upper spindles, $c$, are all in, the battery branches thereby being applied to every circuit, each circuit having a bell or other signal at the office, which indicates a call to the office on that circuit. Now, suppose a call to come from the first circuit, $c'$, the operator pushes in the spindle $b$ on that circuit, which throws off the battery and puts on the ground. He then places his telephone into connection with that circuit, and receives communication from the person calling, saying, for instance, that he wishes to communicate with a certain person, whom the operator ascertains to be on the circuit $c^3$. He then pushes in the spindle $a$ of the circuit $c'$, as in Fig. 3, throwing off both battery and ground; then pushes in the spindle $b$ of the circuit $c^3$, and with the key of circuit $c^3$ gives the signal required to call that particular person, and introduces his telephone to the same circuit. The person answering, the operator gives the information that communication is open for him with the person who called. He then presses in the spindle $a$, taking off both battery and ground, and at the same time presses in the spindle $h$ of the respective circuits $c'$ and $c^3$, making the communication between the two circuits on the bar on which are the spindles $h$. Then, when the parties have completed their communication, the operator pushes in the battery-spindle $c$ and draws out the circuit-spindles $h$, leaving the lines ready for another call.

The object for employing several bars C D E is, that different circuits may be in use at the same time—as, for instance, suppose the first and third are in use, as before described, a call comes from the second circuit to communicate with the fourth, a second bar would be used for connecting those circuits, and two other circuits would take a third bar, and so on. The circuit-spindles $h$ are each provided with a spring, as noted in Fig. 2, the tendency of which is to hold the spindles outward and prevent accidental connection of the circuits.

It will be observed that communication is made from the main wire through the key to the switch-board. Hence when the key is depressed to take it away from the bridge $m$ and make connection with the button below, the switch-board is cut off from the main wire $n$. The advantage of this arrangement is as follows: Supposing the switch-board to be longer than will allow the operator to reach over its extent, and that a call has come to him from one of the extreme circuits. Having received the call, he presses in the lower spindle to disconnect both battery and ground. Then, having made the connection with the bar above, he proceeds to call on the desired circuit, which may be at the other extreme. Having made the call and the connection above with the same bar, he finds that the called party is not responding. He then applies the key to make a recall on that party. Now, if the connection were through the switch-board to the keys, as is usual in such switches, the call made on this second circuit would also pass through the bar on the first circuit and make the call upon that circuit also, which would at once create confusion, unless the two parties should have the same signal; but because of the connection in each circuit being made through the key and bridge it follows that depressing the key from the bridge cuts off the switch-board, and the signal is made by the contact of the key with the button, the current passing out through the key directly to the main wire. Hence the call may be made on any one circuit, notwithstanding that circuit may be in connection with one or more other circuits, and that call not extend beyond the circuit on which it is made.

The lower spindle, $a$, and the levers which connect the several spindles $a$ $b$ $c$ may be dispensed with, and yet the switch-board be fully operative. In that case, however, the operator must work the spindles $b$ $c$ independently of each other—that is, pushing in or pulling out, as the occasion may require.

I claim—

1. The switch-spindles $a$ $b$ $c$, combined with a system of levers, substantially as described, whereby the pressing in of one throws out either of the others which may happen to be in, substantially as and for the purpose described.

2. The combination of the spindles *a b c*, two of which are provided with insulators, with metallic connections, respectively, with the battery and ground, whereby either the battery or ground may be applied or both cut off, substantially as described.

3. The combination of the two spindles *b c*, arranged to cut off or apply, respectively the ground or battery on one circuit, combined with other series of like spindles on other independent circuits, and a bar, C, with couplings arranged to place either one of said circuits in connection with another of said circuits through said bar, substantially as described.

4. The combination of the two spindles *b c*, arranged to cut off or apply, respectively, the ground or battery on one circuit, combined with other series of like spindles on other independent circuits, and two or more bars, C D E, each provided with couplings arranged to place two or more of said circuits in connection with two or more other circuits through said bars, substantially as described.

5. In a switch-board, substantially such as described, the combination of several keys, each on an independent circuit, and each key in direct communication with its particular wire and corresponding bridge or contact connected to the other wire through the switch-connections, whereby communication from one subscriber's wire to another with which it may be placed in connection must be made through the keys and bridges to the connecting-wire of the subscribers' wires, and each of said keys being free to signal through its own wire without communicating such signal to the other wire with which it is in connection, substantially as described.

6. In a telephone-exchange switch, the combination of several subscribers' lines, each provided with a spring-connection, and a beveled or otherwise formed connecting-piece, an electrical connection common to two or more connecting-pieces, arranged to connect their respective lines through such common electrical connection by frictional contact upon said springs, each connecting-piece being provided with a spring to hold it from accidental contact when placed in a disconnected position.

7. In a telephone-exchange switch, a calling-key, a bridge or contact therefor normally in the line-circuit between said line and the connecting devices of the switch, a second contact normally out of circuit, but connected to a generator, whereby the depression of the key cuts off the switch-board, and at the same time connects the line with the generator, substantially as and for the purpose described.

8. In a telephone-exchange switch, the combination of two or more independent lines, each connected to said switch through a key and connecting-point normally in contact with said key, provided with electrical connection to a generator, substantially as and for the purpose described.

9. In a telephone-exchange switch apparatus, the combination, with a series of main-line connections and devices whereby any two of the main lines may be joined for oral communication, of signaling devices for signaling to any one of the lines separately, and a branch or loop independent of the signaling devices, which includes a telephone, and whose terminals are connected to divided insulated metal tips adapted to interpose said telephone in the several lines, thereby adapting the telephone to be placed to the ear for listening and enabling the central-office operator to insert said telephone in any two connected lines without interruption to passing conversation.

10. In a telephone-exchange switch, normally-closed signaling-keys or circuit-breakers, one in each line at a point between the line and the connecting switch devices, whereby the switch-board is cut off from the main line when the key corresponding to that line is depressed.

11. In a telephone-exchange switch, devices for connecting any two lines and a main-line battery normally connected to line through keys and circuits independent of said connecting devices, substantially as described.

12. In a telephone-exchange system, two or more independent lines normally connected at a central office to a battery, switch devices for disconnecting said battery and connecting a line to an independent ground having no battery, and a branch wire from each of said lines to the connecting devices of a switch, substantially as described, so that the main-line circuits to earth at the central office are independent of the switch devices for connecting any two lines.

13. In a telephone-exchange switch, a series of lines, switch devices by which any two of the several lines may be connected, and independent connections through which the several lines may be placed to earth at the central office.

14. In a telephone-exchange switch, connections for each line to a battery, said connections passing through a calling-key, (one for each line,) means for connecting each line to ground independent of said battery, and devices whereby a telephone may be placed in either line when it is grounded, whereby signals may be given upon each line, and when oral communication is desired the telephone may be put to earth, the battery being withdrawn from the line.

15. In a telephone-exchange switch, a series of main lines, devices for maintaining oral communication through either line independent of the condition of the earth communication for the other lines, and independent connections to a battery, whereby signals may be sent on each line separately and independently of the devices used for oral communication.

16. In a telephone-exchange switch, a series of main lines with devices for connecting any two of said lines for oral communication, and separate devices for connecting said lines to a battery and to an independent branch leading to a battery for outgoing signals.

17. In a telephone-exchange switch apparatus, two or more independent lines leading to subscribers' stations, devices for connecting any two lines for oral communication, independent branch circuits (one for each line) at the central office leading to a generator for signaling purposes, and disconnecting devices (one for each line) interposed between the line and the switch devices by which any two lines are connected, whereby a signal may be given upon either of two connected lines to the exclusion of the other without manipulating any of the devices upon such other line.

18. In a central telephone-exchange system, a series of main lines, devices for connecting any two of said lines for oral communication, and connections for each line to a battery, whereby signals may be sent to subscribers' stations on either of said lines independent of incoming calls on any other line.

19. In a telephone-exchange switch, a series of main lines, devices for connecting each line to a branch leading to a battery normally applied to each line, to an independent branch leading to a battery for the purposes of signaling from the central office, or to a third independent branch without a battery for oral communication.

GEORGE W. COY.

Witnesses:
H. C. TOWNSEND,
JOHN J. DIFFLEY.